(12) United States Patent
Judd

(10) Patent No.: US 10,787,899 B2
(45) Date of Patent: Sep. 29, 2020

(54) RESONANT ACOUSTIC STRUCTURE FOR MEASURING WELL OR BOREHOLE DEPTH

(71) Applicant: Stephen Vaughn Judd, Hillsborough, NC (US)

(72) Inventor: Stephen Vaughn Judd, Hillsborough, NC (US)

(*) Notice: Subject to any disclaimer, the term of this patent is extended or adjusted under 35 U.S.C. 154(b) by 241 days.

(21) Appl. No.: 16/037,462

(22) Filed: Jul. 17, 2018

(65) Prior Publication Data
US 2020/0024940 A1 Jan. 23, 2020

(51) Int. Cl.
E21B 47/047 (2012.01)
G01F 23/296 (2006.01)
G01S 15/08 (2006.01)

(52) U.S. Cl.
CPC ........ *E21B 47/047* (2020.05); *G01F 23/2962* (2013.01); *G01F 23/2966* (2013.01); *G01S 15/08* (2013.01)

(58) Field of Classification Search
CPC ...... E21B 47/04; E21B 47/042; E21B 47/047; G01F 23/296; G01F 23/2961–2968; G01S 15/02; G01S 15/08; G01S 15/10–108
See application file for complete search history.

(56) References Cited

U.S. PATENT DOCUMENTS

| | | | | |
|---|---|---|---|---|
| 2,232,476 A | * | 2/1941 | Ritzmann | E21B 47/047 367/86 |
| 4,318,298 A | | 3/1982 | Godbey et al. | |
| 4,389,164 A | | 6/1983 | Godbey et al. | |
| 4,934,186 A | | 6/1990 | McCoy | |
| 5,131,271 A | * | 7/1992 | Haynes | G01F 23/2962 181/124 |
| 5,471,872 A | * | 12/1995 | Cummings | G01F 23/296 73/290 V |
| 6,983,654 B2 | * | 1/2006 | Balin | G01F 23/2962 73/290 V |
| 9,702,242 B2 | * | 7/2017 | Noui-Mehidi | E21B 34/066 |
| 2020/0056473 A1 | * | 2/2020 | Bolt | E21B 47/04 |

* cited by examiner

*Primary Examiner* — Justin N Olamit

(57) ABSTRACT

A method and apparatus to measure the fluid depth in a well or borehole is described. The approach reduces the effects of acoustic noise occurring near the top of the well or borehole that can interfere with the fluid depth measurement. A resonant acoustic structure between an acoustic transducer and the well or borehole provides efficient coupling of spectrally narrow acoustic signals into the well or borehole, as well as providing a bandpass acoustic filter on the returning signal, to improve the signal to noise ratio of the desired acoustic reflection.

10 Claims, 5 Drawing Sheets

RESONANT ACOUSTIC STRUCTURE FOR MEASURING WELL OR BOREHOLE DEPTH

BACKGROUND OF THE INVENTION

Field of Invention

The invention relates to determining the fluid depth in a well or borehole by measuring the time required for an acoustic event generated at the top of the well or borehole to travel down the well or borehole, reflect from the fluid surface, and return to the top of the well or borehole. In particular, the invention relates to methods to improve the detection of the reflected signal in the presence of noise that interferes with the fluid depth measurement.

Description of Related Art

It has become critical to collect information about the liquid level in wells or boreholes for a variety of reasons. These may include the ability to manage water resources, monitoring civil engineering structures such as dams or buildings, and various earthworks such as bridges, roads, landfills, etc. It is important to determine the actual fluid level and have the ability to monitor fluid level changes over time.

A number of techniques have been invented and commercialized over many decades. One method involves introducing a sound pulse at the top of the well or borehole and directing it to the fluid surface at the bottom of the well or borehole. By measuring the Time Of Flight (TOF) between launching the pulse and detecting the pulse that reflects from the fluid surface, and knowing the speed of sound in the well or borehole, the depth of the fluid surface can be estimated. A number of techniques have extended this approach. For example, U.S. Pat. No. 4,934,186 issued Jun. 19, 1990 discloses the detection of reflections from known, regularly spaced collars along the well or borehole to provide calibration signals for the TOF measurement to the fluid surface. In U.S. Pat. No. 4,389,164 issued Jun. 21, 1983 the inventors disclose the use of a TOF acoustic pulse measurement system to control a pump and thereby maintain a desired fluid level in the well or borehole. U.S. Pat. No. 4,318,298 issued Mar. 9, 1982 uses an acoustic TOF system to monitor the fluid level in a well or borehole on a periodic basis.

This approach suffers from false reflections that can result from a plurality of sources, including protrusions, changes in bore diameter, abrupt changes in well or borehole direction, changes in well or borehole wall composition, and resonant effects that can occur between one or more of the above-mentioned perturbations. For larger diameter wells or boreholes, a common mechanical structure at the top of the well or borehole provides one or more side-mounted access ports into the main hole. While the structure can provide convenient access for a depth measurement apparatus, it suffers from several drawbacks, including poor coupling efficiency of acoustic power between the well or borehole and the measurement apparatus, unwanted coupling of mechanical vibrations generated by pumps placed in or near the well or borehole, and a lack of direct line of sight down the well or borehole, resulting in additional stray reflections or attenuation of acoustic pulses that are otherwise intended to travel down the well or borehole.

BRIEF SUMMARY OF THE INVENTION

An objective of the present invention is to provide an improved system suitable for measuring the level of water in a well or borehole, well or other environment and which substantially reduces the disadvantages of earlier methods. Briefly, the invention consists of deploying a slender tube or pipe between an acoustic transducer assembly and the top of a well or borehole. The slender tube or pipe acts as an acoustic filter and an acoustic waveguide. The open ends of the tube act as acoustic partial mirrors, resulting in a series of resonant frequencies that depend on the length of the slender tube or pipe. When the acoustic transducer's output signal contains a substantial amount of energy in a frequency range that overlaps a natural resonant frequency of the slender tube or pipe, then a much larger acoustic signal is transferred into the well or borehole than would otherwise occur. Upon reflection from a liquid surface, the returning acoustic pulses are coupled into the same slender tube or pipe, which transfers the acoustic pulses back to the transducer assembly, where they are detected using a microphone or equivalent acoustic sensor. Since the reflected acoustic signal contains a range of frequencies that match the resonant frequency of the slender tube or pipe, the reflected signal is efficiently coupled through the slender tube or pipe to a detector located near the acoustic transducer. In this way, the slender tube or pipe acts as a narrow band acoustic filter, effectively blocking acoustic noise that can interfere with the detection of the acoustic reflection returning from the bottom of the well or borehole.

One advantage of the present invention is that extraneous acoustic signals that interfere with the distance measurement process are reduced.

Another advantage of the present invention is that it provides efficient coupling of acoustic energy from a side-mounted transducer assembly into the well or borehole.

Another advantage of the present invention is that it provides efficient coupling of acoustic energy returning from a well or borehole, into a side-mounted transducer assembly.

Another advantage of the present invention is that it allows an acoustic transducer assembly to be easily retrofitted to an existing well or borehole installation.

Another advantage of the present invention is that it provides a means of generating low frequency acoustic signals with substantial pressure amplitudes using a transducer with reduced dimensions.

BRIEF DESCRIPTION OF THE DRAWINGS

The invention is described in more detail by reference to the included drawings, in which.

DETAILED DESCRIPTION OF THE INVENTION

Figure 1:
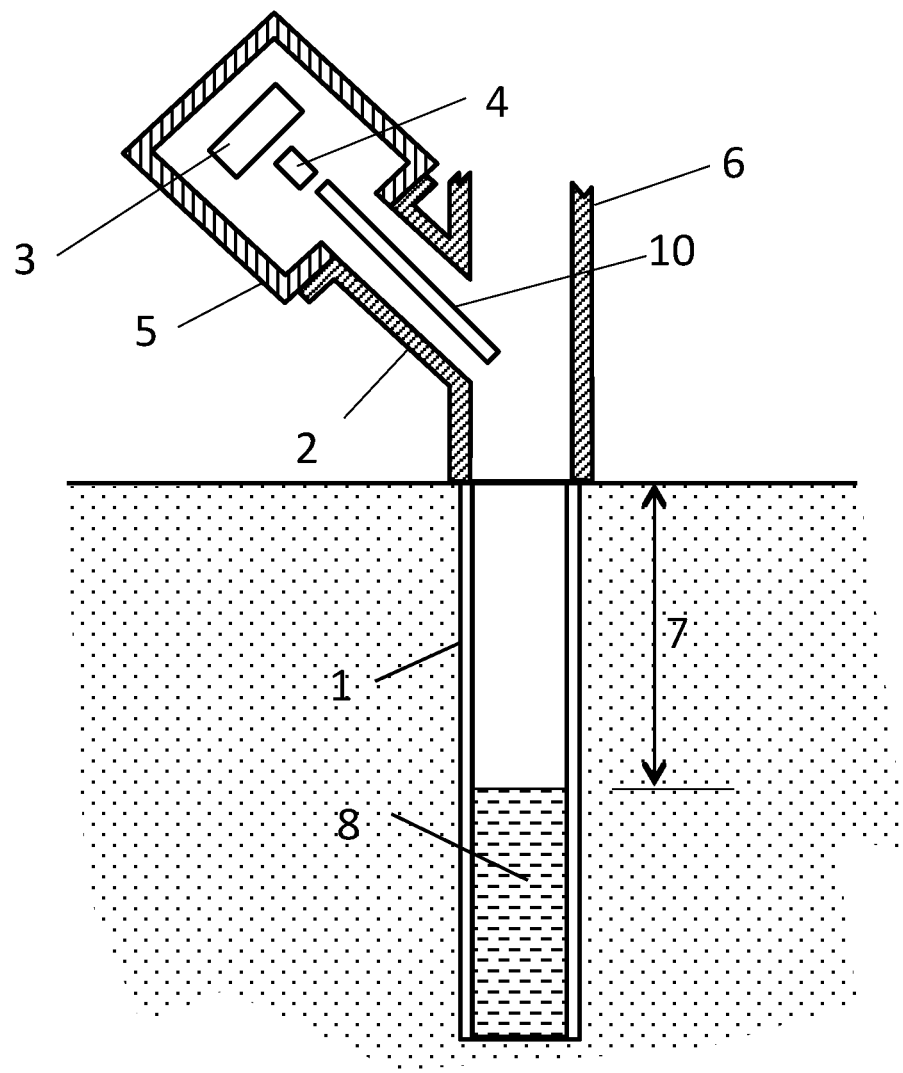
FIG. 1 illustrates a first acoustic measurement apparatus for measuring liquid depth in a well or borehole.

Referring now to FIG. 1, a well or borehole 1 contains liquid 8 at a distance 7 from the well or borehole entrance. A housing 6 is fastened to the well or borehole entrance and contains the components of the sensing apparatus. It is desired to determine the distance 7 by measuring the time of flight of an acoustic pulse generated by a transducer 3 that travels down the well or borehole 1, reflects off the liquid surface, and travels back up the well or borehole 1 to an acoustic detector 4. It is understood that the pulse generating transducer 3 and the detector 4 may be the same transducer in some embodiments of the present invention. In normal operation, the electronic control unit (not shown) generates an electrical pulse that results in an acoustic pulse exiting transducer 3. The acoustic signals detected by detector 4 are processed by an electronic control unit (not shown) and further analyzed to create a measurement of the distance 7. In many well or borehole installations, it is common to include in the well or borehole entrance assembly, one or more side access ports 2 that enable the introduction of devices into the well or borehole without hindering the operation of the well or borehole. In the diagram, a housing 5 is attached to the access port 2 and contains the acoustic transducer 3 and acoustic detector 4. However, the acoustic signals generated in housing 5 may experience a tortuous path before traveling down the well or borehole 1, and reflections returning up said well or borehole experience the same tortuous pathways before arriving at the acoustic detector 4. In order to reduce the acoustic losses associated with these pathways, an acoustic waveguide tube 10 is introduced into the access port. The acoustic waveguide tube 10 consists of a hollow, semi-flexible tube that is fastened at one end within the acoustic housing 5. The other end of the acoustic waveguide tube is positioned in such a manner that its open end is approximately centered in the top of the well or borehole. In this way, the acoustic pulse generated by the transducer 3 is coupled through the acoustic waveguide tube 10, exits the end of the waveguide tube, travels down and back inside the well or borehole, a portion of which is then collected by the waveguide tube 10, and is guided back to the acoustic detector 4 in the housing 5.

Figure 2:
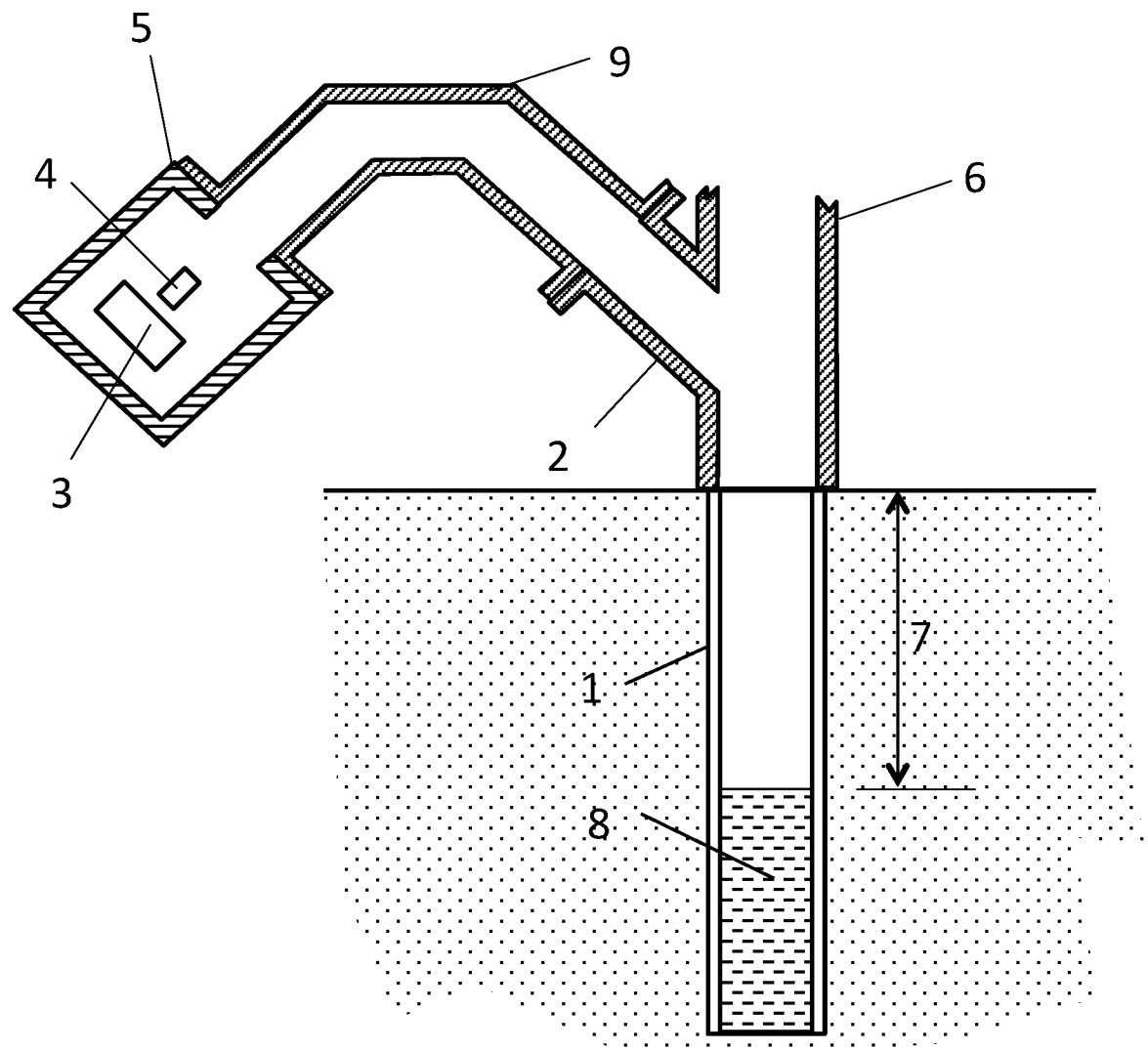
FIG. 2 illustrates a second acoustic measurement apparatus for measuring liquid depth in a well or borehole.

In FIG. 2, a second embodiment of the present invention is illustrated. The acoustic waveguide tube 10 has been eliminated. In this case, the sensor housing 5 is attached to an extension pipe 9, which is then attached to the access port 2 at the well or borehole head housing 6. The acoustic transducer 3 generates an acoustic pulse that is guided by the extension pipe 9. The acoustic reflection returning from the surface of water 8 is guided back to the detector 4 located inside the sensor enclosure 5.

In both of the above cases, it is difficult to couple acoustic energy from the transducer 3 into the waveguide 10 or the extension pipe 9, and also difficult to couple acoustic energy from the waveguide 10 or extension pipe 9 into the well or borehole 1. This is important in that, for a fixed pressure pulse generated by the transducer 3, the reflected acoustic signal pressure amplitude is reduced as the diameter of the well or borehole 1 is increased. The present invention provides a means of improving the coupling of acoustic energy from the transducer 3 into the well or borehole 1, and from the well or borehole 1 back to the detector 4.

Figure 3:
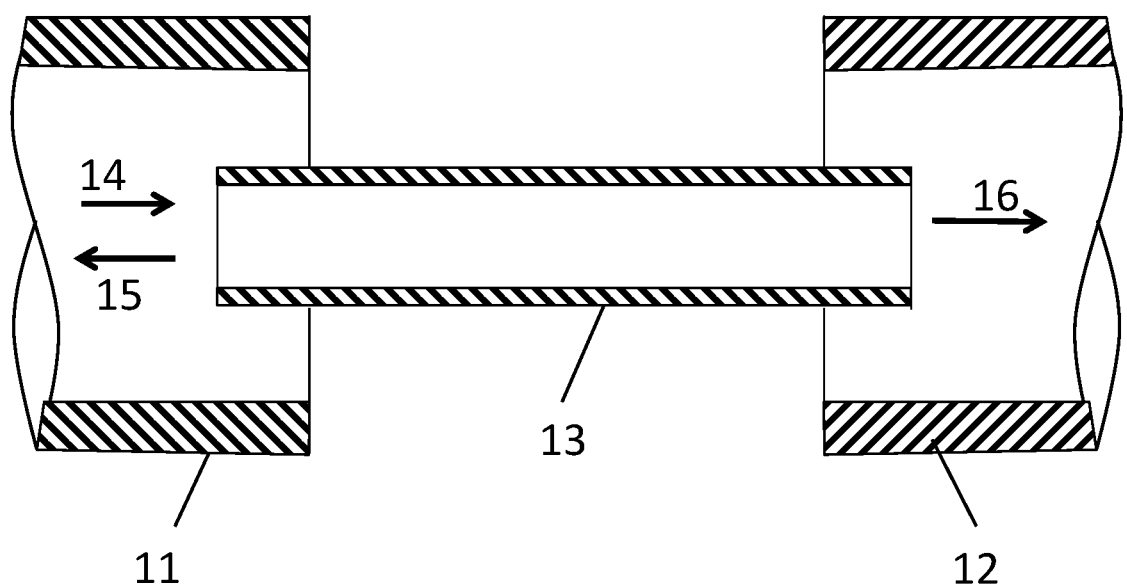
FIG. 3 is an illustration of an acoustic waveguide tube with open ends that terminate into large diameter pipes most generally having different diameters.

The disclosed invention can be further understood with the aid of FIG. 3, which illustrates the situation when an acoustic waveguide is used to couple an acoustic signal between two larger regions. An acoustic waveguide 13 with open ends is positioned so that each end is located inside a larger pipe 11 and 12. The acoustic waveguide 13 has an inside diameter of d1. The two pipes 11 and 12 have larger diameter d2. Although the two pipes 11 and 12 shown in FIG. 3 have the same diameter, this is not required, and has only minor effect on the following discussion.

The acoustic impedance in a region of wave propagation can be calculated based on the acoustic medium and the geometry of the region. The acoustic power transmitted and reflected at the interface between two regions with differing impedances can then be calculated to determine the acoustic power transfer efficiency. The impedance of a region inside a tube where the acoustic wavelength is long compared with the diameter of the tube is given by $$Z = \rho c / S \qquad \text{(Equation 1)}$$

where $\rho$ is the mass density of the medium in the tube, c is the speed of sound in the medium, and S is the cross-sectional area of the structure in which the acoustic wave is propagating, said area S being the projection normal to the direction of propagation. Provided the acoustic medium is the same throughout the assembly, the ratio m of impedances between two regions 1 and 2, defined as $$m = \frac{Z_2}{Z_1} = \frac{\rho c / S_2}{\rho c / S_1} = \frac{S_1}{S_2} \qquad \text{(Equation 2)}$$

can be used to calculate the reflected R and transmitted T acoustic powers as $$R = \left(\frac{m-1}{m+1}\right)^2 \qquad \text{(Equation 3)}$$

$$T = \frac{4m}{(m+1)^2} \qquad \text{(Equation 4)}$$

The larger the difference of impedances in the two regions, the larger will be the resulting reflected power, and the lower will be the acoustic power that enters region 2. This effect is already significant even for values of m=10 (or 0.1, depending on the direction of travel of the incident acoustic wave). For a circular cross-section tube of radius r where $S=\pi r^2$, a value of m=10 corresponds to a diameter ratio of a factor of 3.3 In either case of m=10 or m=0.1, the reflected power is R=0.67, and the transmitted power is only T=0.33, or 33% of the incident power. This represents a significant loss of acoustic power. It also results in a reflected acoustic wave that can interfere with the detection of the desired acoustic signal returning from the liquid in the well or borehole.

An acoustic wave already propagating in pipe 11 is indicated by the direction of travel arrow 14. When this incident wave encounters the end of the acoustic waveguide 13, only a small fraction of the acoustic power is coupled into the waveguide 13. After propagating through the waveguide 13, only a small fraction of the acoustic power is then coupled into the larger pipe 12, shown as the arrow 16. The acoustic power coupled from pipe 11 into pipe 12 via waveguide 13 is given approximately by $(1-R)^2$, where R (shown by Equation 3) is the reflection coefficient at each end of the waveguide 13. Using the above example of a pipe diameter that is approximately 3.3 times larger than the waveguide diameter, the resulting acoustic power coupling efficiency is only 11%. In the present application as a well or borehole depth sensor, the same coupling efficiency applies to the acoustic reflection returning from the well or borehole 1. The resulting round-trip acoustic coupling efficiency is only about 1%. This places difficult requirements on the sensitivity of the detector 4, and makes the measurement susceptible to external sources of acoustic noise associated with water pumps commonly found at well or boreholes of this type.

The present invention discloses a method to overcome this challenge. An implicit assumption in the analysis just provided is that the length of the waveguide 13 is extremely long compared with the acoustic wavelength in use. This leads to the assumption that interferences from reflections inside the waveguide 13 are not considered. In all realistic reductions to practice, however, the several reflections inside the waveguide 13 must be accounted for when predicting the transmission of acoustic waves from region 11 to region 12. The general expression is given by (see Fahy, F., Foundation of Engineering Acoustics, 2001 Elsevier, pp 202-204);

$$T_{waveguide} = \frac{4}{4\cos^2(kL) + (m + 1/m)^2 \sin^2(kL)} \quad \text{Equation (5)}$$

where $T_{waveguide}$ is the transmission coefficient of the waveguide 13 from region 11 to region 12, L is the length of the waveguide 13, and k is the acoustic wavenumber given by $$k = \frac{2\pi f}{c} \quad \text{Equation (6)}$$

with f being the acoustic frequency.

Figure 4:
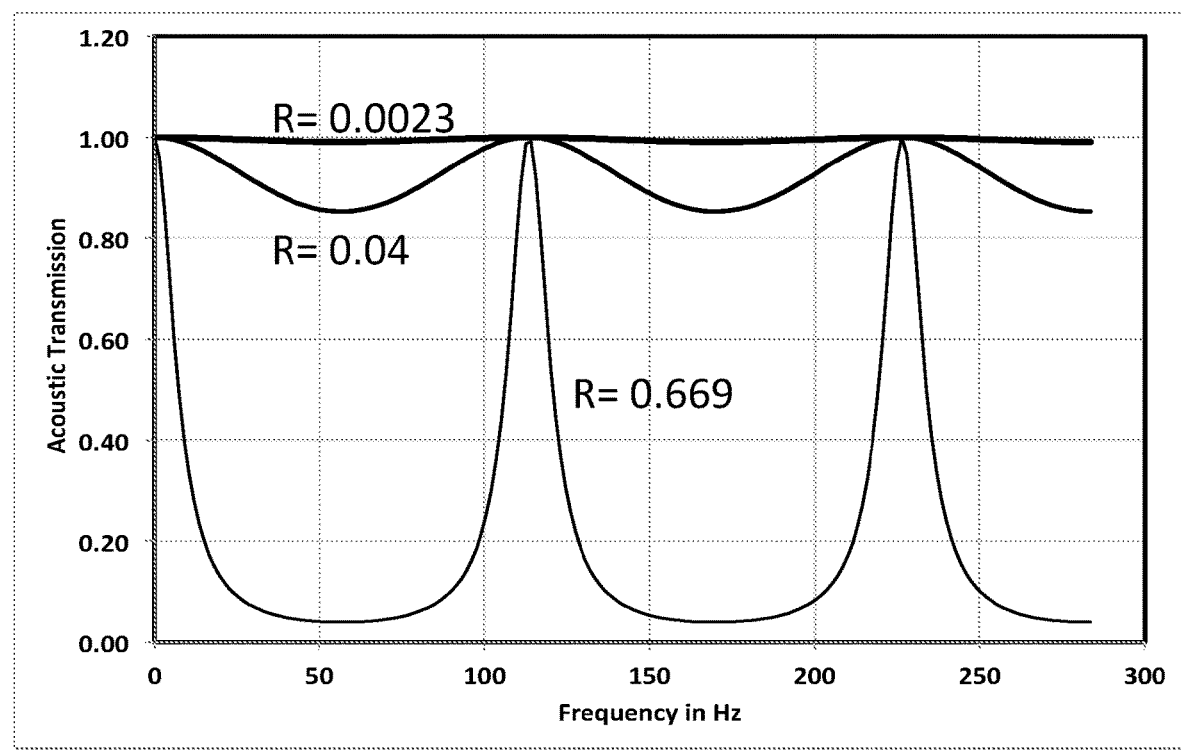
FIG. 4 is an illustration of the acoustic transmission through an open-ended tube versus the frequency of the acoustic signal.

The waveguide 13 behaves as a frequency selective filter, as illustrated by the graph shown in FIG. 4. When the acoustic frequency f is selected so that an integer number of half-wavelengths can exist between the two ends of the waveguide 13, then constructive interference can occur within the waveguide, resulting in a higher acoustic amplitude exiting into region 12 than would otherwise be expected. When this resonant condition is not met, then the transmission through the waveguide 13 is very low. As an illustrative example, a waveguide having a length L=1.5 meters and a diameter d1 much smaller than the acoustic wavelength, is situated between two regions with larger diameters d2. Three curves of the transmission versus frequency are plotted for three different values of reflection R=0.0025, R=0.04 and R=0.67. These three values are achieved by using different diameters d2. As can be seen in the graph, a low reflection coefficient of R=0.0025 results in almost 100% transmission of the acoustic power from region 11 to region 12. This corresponds to the condition where the diameters d1 and d2 are very nearly equal. As the reflection coefficient increases to R=0.04, the frequency dependence of the transmission becomes more pronounced. At a value of R=0.67, there remain certain resonant frequencies where the acoustic transmission is almost 100%, even though the transmission is very low for non-resonant frequencies. In effect, the resonance properties of the waveguide 13 trade off transmission bandwidth for higher throughput in a narrow range of frequencies.

This property is highly beneficial for the present application. Since the depth measurement technique can advantageously employ a narrow range of frequencies, the waveguide 13 provides a means of efficiently transferring acoustic power from region 11 to region 12 by a suitable selection of operating frequencies, or in the case of a preferred, fixed operating frequency, by a suitable selection of length L of waveguide 13.

A second benefit of the deployment of a resonant waveguide 13 is due to the reciprocal acoustic properties of the waveguide. For acoustic reflections returning from the well back to the detector, the acoustic frequencies present in the reflected signal will be substantially similar to those contained in the outgoing acoustic signal. Because of this, the returning acoustic signal will be efficiently transferred from region 12 back to region 11, resulting in an increased signal amplitude at the detector 4.

A third benefit of the deployment of a resonant waveguide 13 is due to the frequency selectivity of the waveguide. In practical application of the present invention, there are often found sources of acoustic noise from ancillary equipment such as pumps associated with the well site. The frequency spectrum of these acoustic noise sources tends to be broadband, and they tend to occur at frequencies higher than those advantageously employed in a well depth measurement. It is desired that these interfering noise sources be attenuated as much as possible at the detector 4 to minimize the need for further electronic filtering of the detected signal. The resonant waveguide 13 is a passive frequency filter that efficiently transfers the frequency components of the desired signal returning from the well, while at the same time attenuating many of the frequency components of the undesired noise being generated by ancillary equipment at the well.

A fourth benefit of the deployment of a resonant waveguide 13 is due to the resonant frequency's dependence on the length L of the waveguide 13. Well depth measurements in some cases make use of low frequency acoustic pulses and suitable interpolation techniques applied to the returning signal to perform accurate depth measurements. The low frequencies selected result in improved depth detection reliability. However, it becomes difficult to generate low frequency acoustic signals with appreciable amplitude while using a physically compact acoustic transducer. The resonant acoustic waveguide 13 solves this challenge by defining the acoustic resonance condition based on the length of the waveguide L. In effect, the waveguide 13 extends the resonant cavity dimension for the acoustic transducer, lowering the resonance frequency where efficient generation of acoustic energy can take place. This is particularly helpful when applying the depth measurement to wells with larger diameter boreholes, such as greater than 50 cm (12 inches) in diameter, that are fitted with access ports having diameters of 2.5 cm to 5 cm (1 to 2 inches) at most.

Although the predicted operation of the resonant waveguide includes an assumption of a continuous wave acoustic signal, in practical applications the acoustic signal is comprised of one or more half-cycles of an acoustic sinusoidal wave, in the form of a tone burst. In this case, the resonance behavior of the waveguide 13 is modified relative to that shown in FIG. 4. The depth of modulation of the transmission will be less than what can be achieved with continuous wave signals. However, all of the benefits listed above remain in the case of using an acoustic tone burst, including the attenuation of undesired noise reaching the detector 4.

When the ends of the acoustic waveguide are both open and have non-zero reflection coefficients, as previously disclosed, the resonant frequencies $f_{oo}$ (where the subscript refers to the waveguide having both ends open) are given by $$f_{oo} = \frac{nc}{2(L + 0.8d)} \quad \text{(Equation 7)}$$

where the integer n=1, 2, 3 ... and d is the diameter of the acoustic waveguide. In normal operation, the first resonant frequency is selected to achieve the lowest possible operating frequency for a given length of acoustic waveguide L.

Figure 5:
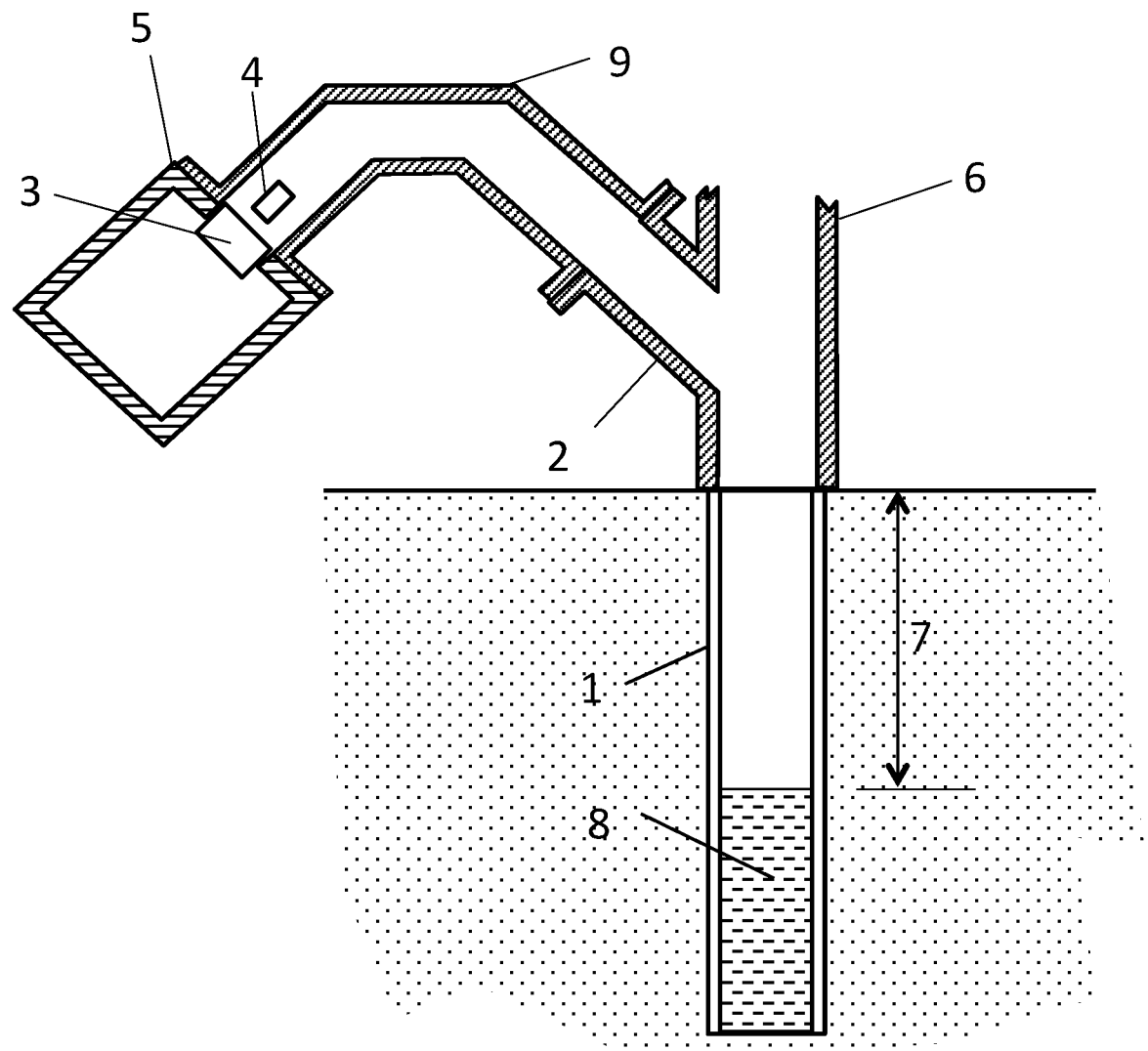
FIG. 5 illustrates a third acoustic measurement apparatus for measuring liquid depth in a well or borehole.

A third embodiment of the disclosed invention is shown in FIG. 5. In this case, the acoustic transducer 3 forms one sealed end of the pipe 9. In this case, the acoustic signal is coupled through the pipe 9 into the well 6. An acoustic reflection occurs at the junction between the side port 2 and the well 6. By selecting the acoustic frequency to be resonant with the combined length of the pipe 9 and the side port 2, the resulting acoustic power coupled into the well 6 is greatly increased. All of the advantages described for the previous embodiment also apply to this arrangement. The only difference is a shift in the resonant frequencies. According to acoustic analysis of ideal acoustic waveguides having one closed end and one open end, the resonant frequencies $f_{co}$ (where the subscript refers to the waveguide having one end closed and the other end open) are given approximately by the following equation:

$$f_{co} = \frac{(2n-1)c}{4(L+0.4d)} \quad \text{(Equation 8)}$$

where the integer n=1, 2, 3 .... This differs from the resonant frequencies predicted for the acoustic waveguide previously described, and can be more clearly understood by way of an example. For example, with a length of L=1.5 meters, c=340 meters/second, and d=0.1 meters, the first resonant frequencies are $f_{oo}$=107 Hertz and $f_{co}$=55 Hertz. When a low resonant frequency is desired, the second embodiment is preferred when the length of the acoustic waveguide L is restricted by other factors.

In most practical implementations of the disclosed invention, the dimensions of the acoustic guiding structure (either a waveguide tube 10 or extension pipe 9) are comparable to the dimensions of the sensor housing 6. In these cases, the housing must be considered a part of the overall acoustic resonant structure for the purposes of calculating the resonant frequencies of the complete structure. The housing 6 behaves as a Helmholtz resonant cavity that is mechanically fastened (and acoustically coupled) to an acoustic waveguide tube 10 or extension pipe 9. The strength of the acoustic coupling between the acoustic waveguide and the housing 6 is determined by the diameter of the acoustic waveguide tube 10 or extension pipe 9 relative to the diameter of the housing 6, This transition results in an acoustic reflection that contributes to the overall acoustic behavior of the structure. As a result, the resonant frequencies of the complete structure will be lower than those calculated by ignoring the housing 6. An approximation for the resonant frequency $f_r$ is given by (see Fahy, F., Foundation of Engineering Acoustics, 2001 Elsevier, pp 60-61):

$$f_r = \frac{c}{2\pi} \sqrt{\frac{S}{V(L+L')}} \quad \text{(Equation 9)}$$

where S is the cross sectional area of the waveguide tube 10 or extension pipe 9, V is the volume of the housing 6, L is the length of the waveguide tube 10 or extension pipe 9, and L' is a correction to the length L to account for the difference in diameters between the housing 6 and the extension pipe 9 or waveguide tube 10. An important result is that the lowest resonant frequency of the structure depends on the diameter as well as the length of the waveguide tube 10 or extension pipe 9, in addition to the volume of the housing 6. Although this complicates the prediction of the resonant frequencies, the functional features of the disclosed apparatus retain the already listed benefits to measuring the depth of a well or borehole. Since every installation on a well or borehole will have unique physical features that preclude the ability to precisely predict the resonant frequency for operation, a technique for automatically determining the resonant frequency should be included as part of the well or borehole measurement system to achieve the best possible performance.

While only certain features of the invention have been illustrated and described herein, many modifications and changes will occur to those skilled in the art. It is understood that the appended claims are intended to cover all such modifications and changes as fall within the true spirit of the invention.

What is claimed is:

1. An apparatus for measuring the distance to an acoustically reflective surface in a well or borehole, comprised of:
    a substantially airtight housing containing an acoustic transducer to generate an acoustic signal and an acoustic detector to measure acoustic signals;
    a tube having a diameter substantially smaller than a diameter of said housing, fastened over an aperture in said housing;
    where said tube is contained within a pipe having a diameter substantially larger than said tube but substantially smaller than said housing;
    where said pipe is fastened over an access port of a well or borehole; where said well or borehole has a diameter substantially larger than said pipe;
    where said tube passes through said access port of said well or borehole and terminates inside said well or borehole;
    where said acoustic transducer produces an acoustic signal with a substantial fraction of energy in a range of frequencies that coincide with at least one resonant frequency of said tube.

2. The apparatus in claim 1 where the transducer is selected from a list of: an electromagnetic speaker, a piezoelectric disc, an electrostatic speaker, and a compressed air solenoid.

3. The apparatus in claim 1 where the pipe has a circular cross-section with a diameter in a range of 1 cm to 30 cm.

4. The apparatus in claim 1 where the pipe is comprised of a material selected from a list of: steel, cast iron, polyvinyl chloride, copper, brass, nylon, fluorinated polymer, polyethylene or stainless steel.

5. The apparatus in claim 1 where the acoustic detector is selected from a list of: a condenser microphone, an electret microphone, a micro-machined microphone, a piezoelectric microphone, an electromagnetic microphone, or a speaker.

6. The apparatus in claim 1 where the well or borehole has a diameter in a range of 1 cm to 200 cm.

7. The apparatus in claim 1 where a length of the pipe is in a range of 1 cm to 1000 cm.

8. The apparatus in claim 1 where the acoustic resonant frequency is in a range of 1 Hertz to 500 Hertz.

9. The apparatus in claim 1 where the acoustic signal generated by the acoustic transducer has a form of a tone burst, where a number of cycles in the tone burst is selected to be in a range of 0.1 to 100.

10. The apparatus in claim 1 where the acoustic signal generated by the acoustic transducer has a form of a tone burst, where the tone burst is repeated with a time interval selected between 0.1 second and 1000 seconds.

* * * * *